June 17, 1969   W. F. HAGGERTY   3,450,459
RETROREFLECTIVE DEVICE
Filed Oct. 24, 1965

INVENTOR
Walter F. Haggerty
BY
ATTORNEY

United States Patent Office 3,450,459
Patented June 17, 1969

3,450,459
RETROREFLECTIVE DEVICE
Walter F. Haggerty, 1341 Ridgewood Terrace,
Arlington, Tex. 76010
Filed Oct. 24, 1965, Ser. No. 504,536
Int. Cl. G02b 5/12
U.S. Cl. 350—103                                     3 Claims

ABSTRACT OF THE DISCLOSURE

A retroreflective device for use in the creation of road signs installed along thoroughfares as warning signals and for general road information for nighttime vehicular traffic, and comprising the formation of a myriad of hexagonal configurations in sheets of relatively thin plastic material, each formed with a plurality of right-angularly opposed surfaces defining prisms capable of reflecting light rays from acute angles with respect to the planar surface of the sheet material.

---

This invention relates to light reflecting devices, and particularly to refractory elements designed for use on public thoroughfares as warning signs and for general road information, especially at nighttime.

The use of light reflecting materials of various compositions and types are well known, such devices being generally characterized by the embodiment of light reflecting crystals, spherical beads, and glass particles embedded in various types of binders, such as transparent or translucent cement on planar backing panels, but such devices have their limitations in that the reflected light rays are not retroreflective and lose their visual effectiveness at acute angular perspectives so that the operator of an approaching vehicle has only a limited view of the illuminated marker or sign before passing, and this is especially true during inclement weather conditions.

The primary object of the instant invention is that of providing an improved refractory material, preferably formed of relatively thin sheet plastic, in the inner or reverse surface of which is formed a myriad of hexagonal configurations, each formed with a plurality of right angularity opposed surfaces defining prisms capable of reflecting light rays in such manner as to be observed at or near a plane relatively close to that of the planar background of the reflective surface, enabling the viewer to observe and read the sign for a longer interval than is possible by the use of conventional reflective materials.

One disadvantage encountered in the use of the refractory types of road signs employing the ordinary and well known beaded surfaces, wherein minute beads and fragments of refractive materials are embedded in a transparent or translucent surfacing agent, is the distortion usually present during periods of precipitation of moisture, and particularly where icing conditions are prevalent, when the otherwise reflective surface is covered with droplets of rain which, in some instances, may be in the form of ice. The distortion which occurs in the use of such conventional reflective materials is not so prevalent when the present invention is employed.

It is an object of the invention to provide a simple and economical pliable sheeting material, preferably formed of plastics of a suitable composition, one surface of which can be impressed or molded in a uniform pattern of minute indentations generally hexagonal in outline and defined by a plurality of segmental prisms, each having a plurality of angular surfaces approximating 90 degrees with respect to each other whereby to produce prismatic refraction of light rays visible to the viewer in relatively close passing range, or reflected in a near 80 degree radius. Thus, in approaching a dangerous intersection, or other area where some hazardous traffic conditions may exist, the motorist may have a greater period of time to be alerted to such conditions.

Broadly, the invention contemplates the provision of an improved retroreflective material by which a wider range of vision in nighttime driving conditions than is possible by the utilization of the variety of devices now in common use whereby light rays emanating from vehicle headlights are reflected to the operator, but whose limitations are such that visibility becomes obscure, as the vehicle approaches the signal, and at a substantial distance therefrom, or before the viewer has sufficient opportunity to fully comprehend the signal sought to be transmitted.

While the foregoing objects are paramount, other and lesser objects will become apparent as the description proceeds, when considered in connection with the appended drawings wherein.

Figure 1:
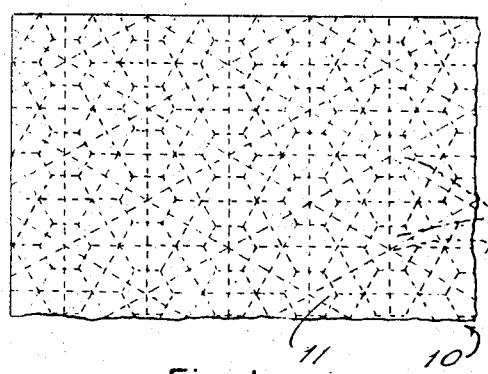
FIGURE 1 is a fragmentary plan view of the obverse surface of the light reflective device embodying the invention, the broken lines indicating the uniform pattern by which the individual reflective elements are arranged.
Figure 2:
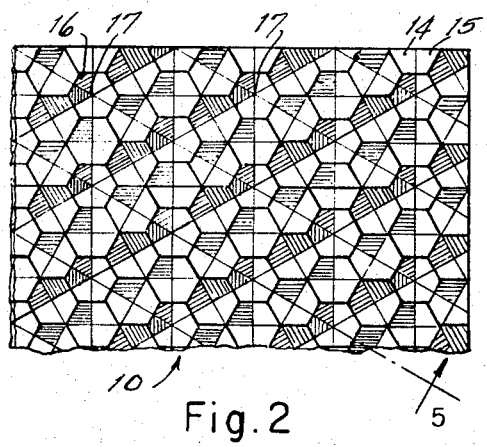
FIGURE 2 is a fragmentary illustration of the reverse surface of the invention embodying the myriad of refractive elements formed therein.
Figure 4:
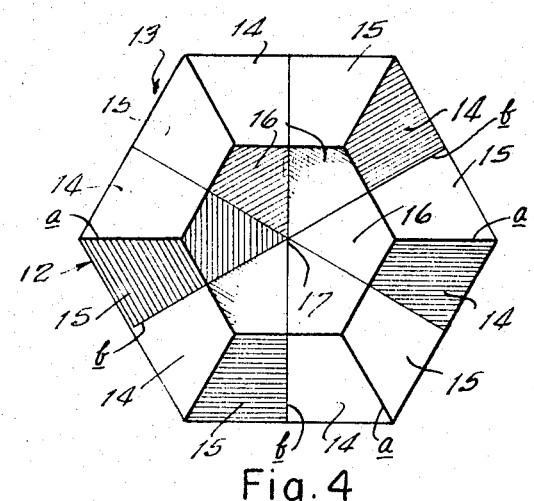
Figure 5:
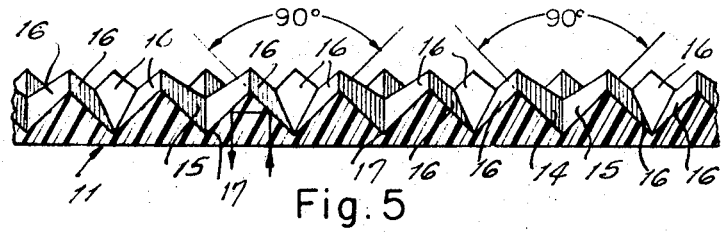

FIGURE 4 is a plan view of a single unit, forming a part of the arrangement shown in FIGURE 2, illustrating the several segments, each formed with a plurality of angular surfaces, the planes of which are right angularly opposed, and FIGURE 5 is a fragmentary sectional view, on line 5—5 of FIGURE 2, indicating the opposing angular surfaces of the radially disposed segments as 90 degrees with respect to each other, and the obtuse angular planes of the joining outer surfaces of each segment.

The invention is preferably formed from relatively thin sheet plastic materials of the transparent or translucent type, readily moldable or rolled into sheets of a variety of thicknesses and widths. It is of great importance that the material be capable of production in a variety of colors, especially those most frequently used in the production of warning and information signs along public thoroughfares, or the material may be colorless and a coating of color applied thereto, and having the capability to reflect light rays from the headlights of vehicles traveling thereon.

Figure 3:
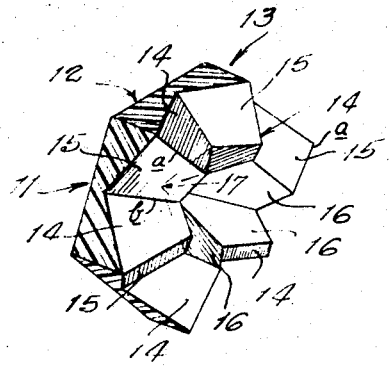
FIGURE 3 is a perspective illustration of one of the individual reflective elements, partially in section, showing the variety of angular reflecting surfaces resulting from the radial arrangement of prisms.

It is contemplated that the refractive media, consisting of the myriad of angular surfaces defined by the uniform pattern of radially disposed prisms, as illustrated in FIGURES 3 and 4, be impressed, molded, or otherwise formed in one surface of a sheet of plastic material, generally designated by the numeral 10, by a die in the form of a platen or roller (not shown), the impressions being closely spaced and of relatively small dimensions whereby they appear on the obverse surface 11 of the sheet 10, which is transparent or translucent, as a radial arrangement of serrations or pyramidal segments of a hexagonal rosette 12, as shown in detail in FIGURE 4, and in a regular pattern, as shown in FIGURE 2.

Referring to FIGURE 4, each individual hexagonal element 12 comprises six radial segments 13, each having three angular surfaces 14, 15 and 16 integrally joined to define a hexagonal central depression 17, the angular surfaces 16 of which are inclined at 45 degree in opposing relation, or 90 degrees with respect to each other and in plan, each surface 16, as well as the surface 14 and 15, are trapezoidal in outline. Thus, the angles of incidence of the reflected light beams produce a variety of angles of refraction by which the reflection is projected in such manner as to be visibly effective at substantially acute angles from the planar surface 11 of the obverse side of the element 10. This is possible by reason of the relatively acute angles of the apices $a$ and the obtuse angles of the valley $b$ between the surfaces 14 and 15 of the outer radial arrangement of prisms, as shown in FIGURES 3 and 4.

FIGURE 5, which is a sectional view of the panel or sheet 10, on lines 5—5 of FIGURE 2, graphically illustrates the angular relationship of the central surfaces 16 at the center of the element 12. The angular relationship between the opposing surfaces 16, at their greatest depth at 17, or at the center of the element 12 being 90 degrees, as indicated in FIGURE 5, is such that the angles of incidence and refraction are such that light rays are directed at maximum angles with respect to the planar surface 11, as indicated by the arrows in FIGURE 5. Visibility of the reflected light rays are possible at or nearly 80 degree angle with respect to the obverse surface 11. A coating of a reflective material, such as vacuum metalizing, may be applied to the angular surfaces 14, 15 and 16, if desired, to enhance the reflective qualities of these elements through the sheet 10 which is of the type capable of being rolled.

It is important that the hexagonal pattern defined throughout the overall design be maintained in order to achieve the desired results. The angles of incidence of reflection have been established to insure a maximum lateral range of reflected light so as to be visible at nearly right angles, or while passing.

While the invention has been described in substantial detail as to design and arrangement of the reflective elements, and the manner of production, it is intended that the inventive concept be limited only by the spirit and intent thereof and by the scope of the appended claims.

What is claimed is:

1. In a retroreflective warning signal for vehicular traffic, a transparent plastic sheeting having a planar obverse surface and a reverse reflective surface, the reverse surface being apparent when observed from the obverse surface, a pattern of individual uniform interrelated hexagonal configurations formed in the reverse surface, each configuration defined by a series of radial contiguous segments having trapeziform opposingly inclined facets, one plane of each of said facets being centrally inclined inwardly and outwardly 45 degrees toward and from the obverse surface respectively and contiguous with like facets on adjacent segments defining a common central peak pointed toward said obverse surface, and the planes of the other said facets forming the periphery thereof being inclined inwardly at 45 degrees toward said obverse surface, and 90 degrees with respect to each other whereby light rays directed from any angle up to 80 degrees with respect to a line perpendicular to the planar obverse surface are reflected back to the source.

2. A retroreflective device as described in claim 1, the said facets of each segment being in trilateral arrangement and each segment having a trapezium outline.

3. A retroreflective device as described in claim 1, the outer marginal outlines of said other facets collectively defining the angular outlines of said hexagonal configurations.

References Cited

UNITED STATES PATENTS

| 285,270 | 9/1883 | Jaeger | 350—109 X |
| 2,128,390 | 8/1938 | Zerilli | 350—102 |
| 2,310,790 | 2/1943 | Jungersen | 350—109 |
| 3,057,256 | 10/1962 | Erban | 350—103 X |

FOREIGN PATENTS

| 330,080 | 6/1930 | Great Britain. |
| 490,237 | 8/1938 | Great Britain. |
| 873,098 | 6/1942 | France. |
| 986,757 | 10/1951 | France. |

DAVID SCHONBERG, *Primary Examiner.*

PAUL R. GILLIAM, *Assistant Examiner.*

U.S. Cl. X.R.

350—109